United States Patent
Shibata

(10) Patent No.: US 6,967,693 B2
(45) Date of Patent: Nov. 22, 2005

(54) TELEVISION SIGNAL TRANSMITTER INCLUDING A BANDPASS FILTER WITHOUT TRACKING ERROR

(75) Inventor: Etsuya Shibata, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 554 days.

(21) Appl. No.: 10/190,084

(22) Filed: Jul. 3, 2002

(65) Prior Publication Data

US 2003/0007102 A1    Jan. 9, 2003

(30) Foreign Application Priority Data

Jul. 5, 2001 (JP) ............................ 2001-204863

(51) Int. Cl.[7] .............................................. H04N 5/38
(52) U.S. Cl. ..................... 348/723; 348/731; 348/732; 348/733
(58) Field of Search ................ 348/723, 724, 348/731, 732, 733, 735; 455/118, 119, 181.1, 455/182.1, 183.1, 189.1; H04N 5/38

(56) References Cited

U.S. PATENT DOCUMENTS

| 5,200,826 A | | 4/1993 | Seong | |
| 5,507,025 A | * | 4/1996 | Rodeffer | ..................... 455/266 |
| 5,956,098 A | * | 9/1999 | Mizukami et al. | .......... 348/735 |
| 5,995,169 A | * | 11/1999 | Hatano | ........................ 348/726 |
| 6,768,902 B1 | * | 7/2004 | Kajita | .......................... 455/313 |
| 2001/0040643 A1 | * | 11/2001 | Kudo | .......................... 348/723 |

FOREIGN PATENT DOCUMENTS

| JP | 07-038384 | 2/1995 |
| JP | 10-294929 | 11/1998 |

* cited by examiner

Primary Examiner—John Miller
Assistant Examiner—Trang U. Tran
(74) Attorney, Agent, or Firm—Brinks Hofer Gilson & Lione

(57) ABSTRACT

A television signal transmitter includes a mixer in which an intermediate-frequency television signal is frequency-converted into a television signal on a channel used for transmission in a predetermined frequency range, a bandpass filter to which the television signal on the channel used for transmission is input and the passband center frequency of which is changed by an applied control voltage, a memory which stores, in the form of digital data, voltages for setting the passband center frequency to equal the frequencies of a plurality of channels in the frequency range, and a D/A converter which converts the digital data into each analog voltage. The analog voltage, at which the passband center frequency equals the frequency of the channel used for transmission, is applied as the control voltage to the bandpass filter.

2 Claims, 2 Drawing Sheets

TELEVISION SIGNAL TRANSMITTER INCLUDING A BANDPASS FILTER WITHOUT TRACKING ERROR

This application claims the benefit of priority to Japanese Patent Application 2001-204863, filed on Sep. 5, 2001.

BACKGROUND OF THE INVENTION

1. Field of the Invention

The present invention relates to a television signal transmitter for use in a cable television system, or the like, in which an intermediate-frequency television signal modulated by an analog or digital picture signal is frequency-converted into a television signal on a channel for transmission.

2. Description of the Related Art

A conventional television signal transmitter is described below by using the circuit diagram shown in FIG. 3. An intermediate-frequency television signal is input to a mixer 23 via a first variable attenuator 21 and a preamplifier 22. The amount of attenuation in the variable attenuator 21 can be changed by an automatic gain control (AGC) voltage. A local oscillating signal is supplied from a local oscillator 24 to the mixer 23. The local oscillator 24 is constituted by a voltage-controlled oscillator including a varactor diode (not shown). A control voltage is applied to the varactor diode by a phase-locked loop (PLL) circuit 25. The local oscillator 24 oscillates at a frequency corresponding to the control voltage. Channel-setting data D for determining the local oscillating frequency is input to the PLL circuit 25.

The mixer 23 mixes the intermediate-frequency signal and the local oscillating frequency so that the intermediate-frequency signal is frequency-converted into a television signal on any channel in the range from the very high frequency (VHF) band to the ultrahigh-frequency (UHF) band. The obtained television signal is then transmitted. Thus, the channel used for transmission is directly determined by the local oscillating frequency. The local oscillating frequency is set by the channel-setting data D input to the PLL circuit 25.

The television signal output from the mixer 23 is amplified by a first-stage output amplifier 26, and is input to a bandpass filter 27. The bandpass filter 27 comprises one having a varactor diode (not shown), such as a double-tuned circuit. The passband center frequency of the bandpass filter 27, used as-a tuning frequency, is determined by the control voltage applied to the varactor diode by the PLL circuit 25. The television signal transmitter is designed so that the frequency of the television signal and the tuning frequency of the bandpass filter 27, which correspond to a single control voltage, can be made equal to each other.

After passing through the bandpass filter 27, the television signal is sequentially output via a second variable attenuator 28, a second-stage output amplifier 29, and a broadband bandpass filter 30. Also the amount of attenuation in the second variable attenuator 28 can be changed by an AGC voltage. In addition, the television signal is input from the second output amplifier 29 to a detector 31, and the AGC voltage output from the detector 31 is supplied to the first and second variable attenuators 21 and 28.

In the above-described construction, although the television signal output from the mixer 23 is a signal on any channel in the range from the VHF band to the UHF band, the covered range of channels outputable by a single television signal transmitter is limited to a predetermined frequency band. The frequency ratio of the highest frequency channel to the lowest frequency channel is set at two or less. Thus, the highest passband center frequency of the bandpass filter 27 is double the lowest passband center frequency or less. This avoids interference caused by the second harmonic of the television signal output from the mixer 23, and avoids interference caused by a leakage oscillating signal from the local oscillator 25 and by an image frequency signal.

As described above, the television signal transmitter is designed so that the frequency of the television signal output from the mixer 23 and the passband center frequency of the bandpass filter 27 can be made equal to each other, even if the control voltage applied to the local oscillator 24 and the bandpass filter 27 by the PLL circuit 25 is changed. However, actually, the sensitivities of changes in the two frequencies with respect to the control voltage differ, thus generating a difference between the two frequencies. This is because the oscillating frequency of the local oscillator 24 and the tuned frequency of the bandpass filter 27 differ by the frequency of the input intermediate-frequency signal. For example, as FIG. 4 shows, if the oscillating frequency of the local oscillator 25 and the tuned frequency of the bandpass filter 27 are set to predetermined values (reference values) when the control voltage is V1, the oscillating frequency changes by a frequency-change amount when the control voltage is changed to V2, which is caused by the occurrence of a so-called "tracking error".

Consequently, a problem occurs in that the in-band characteristics of the television signal cannot be accurately transmitted since the passband center frequency of the bandpass filter 27 is shifted from the frequency of the television signal output from the mixer 23. Although the problem can be solved by broadening the pass band of the bandpass filter, interference caused by the leakage oscillating signal and the image frequency signal increases.

SUMMARY OF THE INVENTION

It is an object of the, present invention to adjust the passband center frequency of a bandpass filter to the frequency of a television signal, regardless of tracking error between the local oscillating frequency of a local oscillator and the passband center frequency of the bandpass filter.

To this end, the present invention provides a television signal transmitter including a mixer in which an intermediate-frequency television signal is frequency-converted into a television signal on a channel used for transmission in a predetermined frequency range, a band-pass filter to which the television signal on the channel used for transmission is input and the passband center frequency of which is changed by the value of an applied control voltage, a memory which stores, in the form of digital data, voltages for setting the passband center frequency to equal the frequencies of a plurality of channels in the frequency range, and a D/A converter which converts the digital data into each analog voltage. The analog voltage for setting the passband center-frequency to equal the frequency of the channel used for transmission is applied as the control voltage to the bandpass filter.

Thus, the frequency of the television signal output from the mixer is made equal to the passband center frequency of the bandpass filter, without generating any tracking error. Accordingly, the passband of the bandpass filter can be narrowed, thus reducing interference caused by harmonics.

Preferably, voltages for setting the passband center frequency to equal the frequencies of a plurality of predetermined channels selected from among the plurality of channels are stored in the memory, and a voltage for setting the passband center frequency to equal the frequency of a channel other than the predetermined channels is complemented by performing calculation using the stored voltages.

Therefore, the storage capacity of the memory can be reduced.

The frequency interval of the predetermined channels may be set to be broad in the lower frequency range of the channels, and may be set to be narrow in the higher frequency range of the channels.

This enables both a reduction in the storage capacity of the memory and an increase in the precision of a new voltage found by complementing.

DESCRIPTION OF THE PREFERRED EMBODIMENTS

A television signal transmitter of the present invention is described below with reference to FIGS. 1 and 2.

Figure 1:
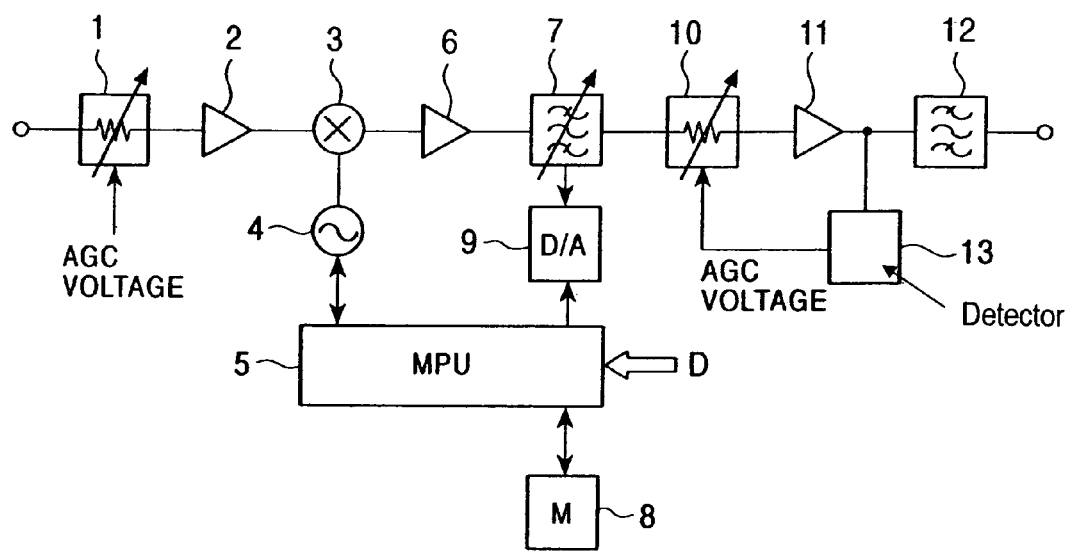
FIG. 1 is a circuit diagram showing a television signal transmitter of the present invention.
Figure 2:
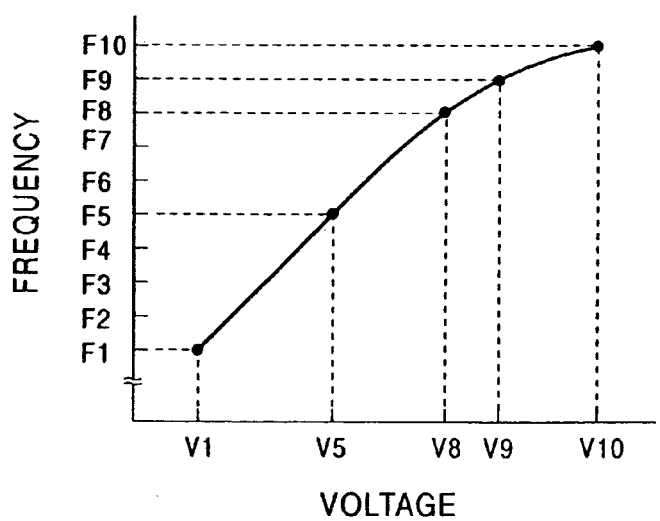
FIG. 2 is a graph illustrating voltages stored in a memory of the television signal transmitter of the present invention.
Figure 3:
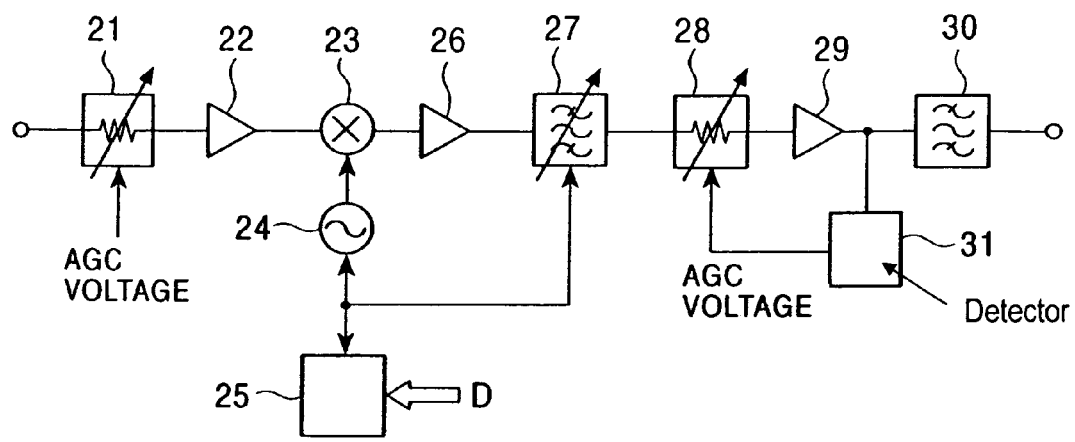
FIG. 3 is a circuit diagram showing a conventional television signal transmitter.
Figure 4:
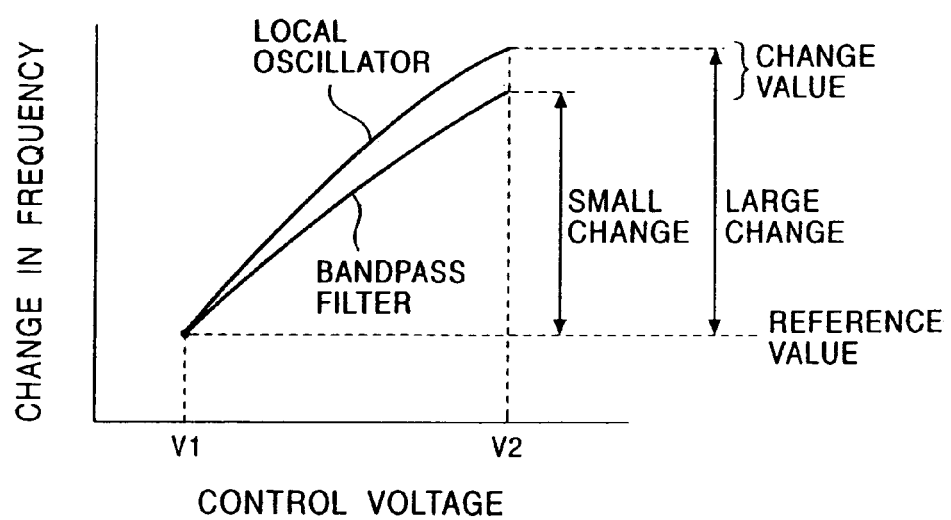
FIG. 4 is a graph illustrating tracking error in the conventional television signal transmitter.

FIG. 1 is a circuit diagram. An intermediate-frequency television signal is input to a mixer 3 via a first variable attenuator 1 and a preamplifier 2. The amount of attenuation in the variable attenuator 1 can be changed by an AGC voltage. A local oscillating signal is supplied from a local oscillator 4 to the mixer 3. The local oscillator 4 is constituted by a voltage-controlled oscillator including a varactor diode (not shown). A first control voltage is supplied from a microprocessor unit (MPU) 5 having a PLL function to the varactor diode. The local oscillator 4 oscillates at a frequency corresponding to the first control voltage. Channel-setting data D for determining the local oscillating frequency is input to the MPU 5.

The mixer 3 mixes the intermediate-frequency signal and the local oscillating frequency so that the intermediate-frequency signal is frequency-converted into a television signal on any channel in the range from the VHF band to the UHF band. The obtained television signal is then transmitted. Thus, the channel used for transmission is directly determined by the local oscillating frequency, and the local oscillating frequency is set by the channel-setting data D input to the MPU 5.

The television signal output from the mixer 3 is amplified by a first-stage output amplifier 6, and is input to a bandpass filter 7. The bandpass filter 7 comprises one having a varactor diode (not shown), such as a double-tuned circuit. The passband center frequency of the bandpass filter 7, used as a tuning frequency, is determined by a second control voltage applied to the varactor diode. The passband center frequency is set to equal the frequency of the television signal output from the mixer 3. The second control voltage applied to the varactor diode is stored in a memory 8 (e.g., a flash memory) in the form of digital data made by a method which is described later.

The first control voltage is output based on the input channel-setting data D, and is supplied to the local oscillator 4 by the MPU 5. The MPU 5 reads digital data from the memory 8, and inputs the digital data to a D/A converter 9. The D/A converter 9 converts the digital data into an analog voltage, and applies the analog voltage as the second control voltage to the varactor diode of the bandpass filter 7.

After passing through the bandpass filter 7, the television signal is output sequentially through a second variable attenuator 10, a second-stage output amplifier 11, and a broadband bandpass filter 12. Also the amount of attenuation in the second attenuator 10 is changed by the AGC voltage. The television signal is input from the second-state output amplifier 11 to a detector 13, and an AGC voltage output from the detector 13 is supplied to the first-stage and second-stage variable attenuators 1 and 10.

In the above-described construction, as described above, the television signal output from the mixer 3 is a signal on any channel in the range from the VHF band to the UHF band. However, the covered range of channels outputable by a single television signal transmitter is limited to a predetermined frequency band. For example, in the lower frequency range of all the frequency bands from the VHF band to the UHF band, several channels are covered by this frequency band, and in the higher frequency range, ten and several channels are covered by this frequency band.

In a predetermined frequency range, one channel is designated as a channel used for transmission by the channel-setting data D. Also, in the above frequency range, the frequency ratio of the highest frequency channel to the lowest frequency channel is set at two or less. Therefore, the highest passband center frequency of the bandpass filter 7 is the double of the lowest passband center frequency or less. This avoids interference caused by a leakage local oscillating signal output by the mixer 3 and the image frequency signal.

In the memory 8, voltages at which the passband center frequency of the bandpass filter 7 equals the frequencies of channels in the predetermined frequency range are stored in the form of digital data. To store these voltage, the passband center frequency of the bandpass filter 7 and the second control voltage required therefor are measured beforehand, and voltages at which the passband center frequency equals the frequencies of the channels in the above frequency range are stored in the memory 8.

The MPU 5 designates a channel used for transmission in accordance with the input channel-setting data D, and supplies the local oscillator 4 with the first control voltage. From the digital data stored in the memory 8, digital data corresponding to the frequency of the designated channel is read and sent to the D/A converter 9 by the MPU 5. As a result, the frequency of the television signal output from the mixer 3 equals the passband center frequency of the bandpass filter 7.

In the memory 8, voltages corresponding to all the channels in the predetermined frequency range may be stored. However, in a viewpoint of the storage capacity of the memory 8, a voltage corresponding to a predetermined channel which is selected should be stored. FIG. 2 shows the storage of voltages. For example, when the predetermined frequency range covers ten channels, these channels have frequencies F1 to F10, and voltages V1 to V10 respectively correspond to the frequencies F1 to F10, the voltages of four points, that is, V1, V5, V8, and V10 are stored. This can reduce the storage capacity of the memory 8.

If a channel (e.g., the channel at the frequency F9) for which no voltage is stored is designated by channel-setting data D, the voltages (V8 and V10) stored for the upper and lower channels (having frequencies F8 and F10) are calcu lated by the MPU 5, whereby the voltage V9 corresponding to the designated channel (F9) is found and complemented. The calculation is digitally performed, and the channel interval for voltages to be stored is determined in a range where error in a new calculated voltage does not become a problem.

In addition, because the characteristics of the varactor diode indicate that the frequency and the voltage are almost linear in the lower frequency range and more curve as the frequency is higher, the frequency interval of channels for which voltages are stored is set to be broader as the frequency is smaller, and is set to be narrower as the frequency is higher. This enables both a reduction in digital data to be stored and an increase in the precision of a new voltage found by complementing.

What is claimed is:

1. A television signal transmitter comprising:
   a mixer in which an intermediate-frequency television signal is frequency-converted into a television signal on a channel used for transmission in a predetermined frequency range;
   a band-pass filter to which the television signal on said channel used for transmission is input and the passband center frequency of which is changed by the value of an applied control voltage;
   a memory which stores, in the form of digital data, voltages that set the passband center frequency to equal the frequencies of a plurality of channels in the frequency range; and
   a D/A converter which converts the digital data into each analog voltage;
   wherein the analog voltage that sets the passband center frequency to equal the frequency of said channel used for transmission is applied as the control voltage to said bandpass filter, voltages that set the passband center frequency to equal the frequencies of a plurality of predetermined channels selected from among said plurality of channels are stored in said memory, and a voltage that sets the passband center frequency to equal the frequency of a channel other than the predetermined channels is complemented by performing calculation using the stored voltages.

2. A television signal transmitter according to claim 1, wherein the frequency interval of the predetermined channels is set to be broad in a lower frequency range of the channels, and is set to be narrow in a higher frequency range of the channels.

* * * * *